June 6, 1950

H. W. ANDERSON 2,510,363

MEANS FOR PROJECTING AN IMAGE ONTO LITHOGRAPHING PLATES

Filed July 13, 1949

Inventor
Harold W. Anderson
by M. Talbert Dick
Attorney

Witness
Edward P. Seeley

Patented June 6, 1950 2,510,363

UNITED STATES PATENT OFFICE 2,510,363

MEANS FOR PROJECTING AN IMAGE ONTO LITHOGRAPHING PLATES

Harold W. Anderson, Des Moines, Iowa

Application July 13, 1949, Serial No. 104,426

3 Claims. (Cl. 88—24)

The employment of a chase in the printing art is old in connection with the use of printing plates. However, the adaptation of a chase into a device providing a novel and efficient method for projecting an image onto lithographing or printing plates was not known to nor taught by the prior art and is the subject of my invention. One of the steps in making lithographing or printing plates by a photocomposing or Step and Repeat machine is to place a negative or positive of the matter to be printed in such a position so that the image thereof can be projected onto some sensitized surface. This sensitized surface is thereafter further processed in an established manner with which my invention is not concerned.

In projecting the image of the negative or positive onto the sensitized surface, I have discovered that the use of a chase for holding the negative or positive can, by being constructed according to my invention, greatly expedite and facilitate the making of the plates, thereby providing a use and function for chases not taught by the prior art.

In my invention I have provided a circular glass portion rotatably arranged in the center of a chase and upon which I detachably secure the negative or positive to be projected. Also I provide a calibrated portion of the chase frame adjacent the periphery of the chase so that angle projection positions can be accurately ascertained and repeated for subsequent projections. To merely use a standard chase in my method of making lithographing or printing plates, which method will be more fully described later on, would be impractical and unsatisfactory for several reasons which I will now explain.

In making printing plates by a photocomposing machine or the like, it is frequently desirable to utilize as much of the sensitized surface receiving the projection as possible. This can only be accomplished by making the projection at an angle at times, and to do this with an ordinary chase would be a cumbersome and tedious task. This is true because the standard chase if used as such for the purposes herein referred to have only a vertical and horizontal adjustment. Consequently, if a projection is desired at an angle, the negative or positive must be removed from the glass portion of the chase and re-set at the desired angle. Thus, in order to utilize all the sensitized surface upon which the projection is to be made, several time-consuming re-settings of the negative or positive are frequently necessary.

These disadvantages of merely using the current type chase for making printing plates become more apparent when color lithographing is desired because then more than one plate is required and the respective projection on each plate having a different color for the same reproduction must be positioned in exact corresponding relation to each other on the respective plates. If this is not accomplished the color impressions will not appear in proper alignment. Therefore, much time and effort is taken up by re-setting and aligning the positive or negative at the proper angle to insure an accurate reproduction. In my invention I have overcome these objections by a device, the principal object of which is to provide a calibrated chase rotatably arranged in a frame and having a glass portion secured thereto so that a positive or negative placed on the glass portion can, by easy rotatable adjustment be projected at different angles and positions, when desired, without removing and resetting the positive or negative on the glass, and thereby providing an easy and efficient means for projecting an image onto lithographing or printing plates with photocomposing machine or the like.

A further object of this invention is to provide a rotating chase for use with a photocomposing or Step and Repeat machine that is designed to indicate the exact position or angle at which a positive or negative is projected onto a surface so that a second projection of the same subject for color reproduction can subsequently be quickly and easily projected onto a second surface in a position corresponding thereon to the projection on the first surface and thereby assuring a perfect fit on color reproduction requiring more than one plate.

A still further object of this device is to provide a rotating chase for use in making lithographing or printing plates that is easy to use, economical in manufacture and efficient in operation.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Figure 1:
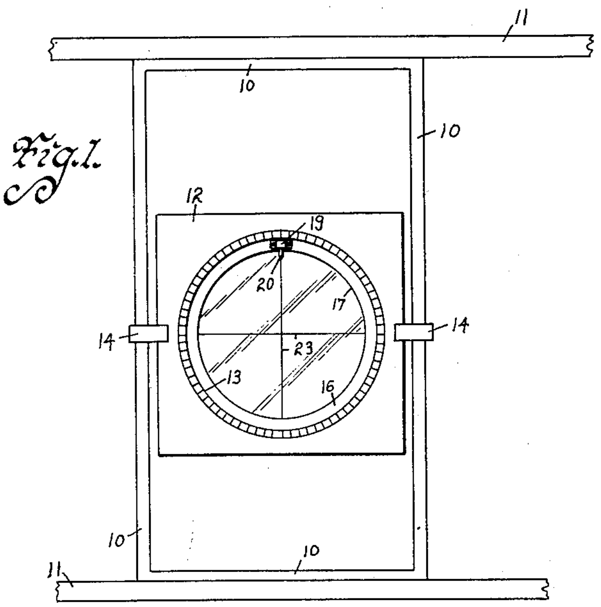
Fig. 1 is a front view of this device ready for use.

Referring to the drawings I have used the numeral 10 to designate a rectangular frame movably engaging its support members 11. The frame 10 is designed for horizontal adjustment within its supporting members 11 which are calibrated to facilitate this adjustment, but this element being old and not claimed by itself as invention, is not shown in detail.

Figure 3:
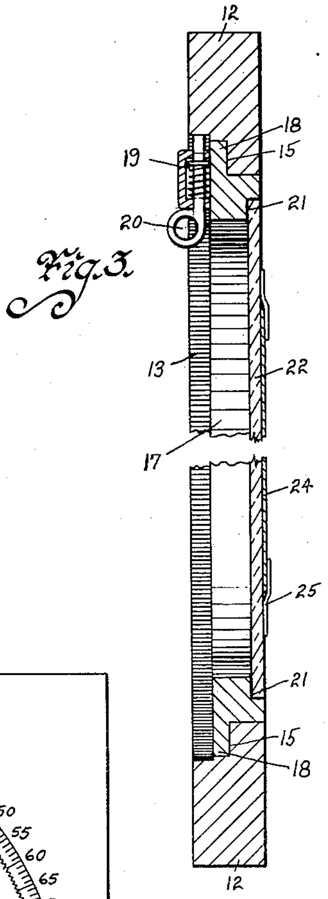
Fig. 3 is a cross-sectional view of this device taken on line 3—3 of Fig. 2.
Figure 2:
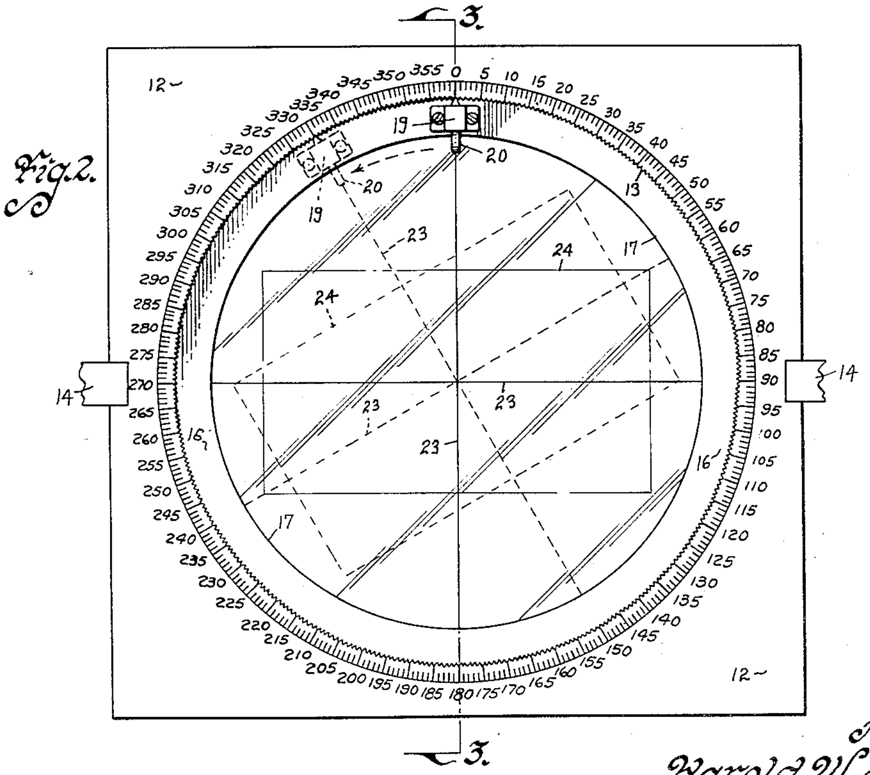
Fig. 2 is an enlarged view of the center portion of Fig. 1 of this device and more fully illustrating its construction and use.

The numeral 12 designates a flat rectangular frame member having its center portion cut out to form the annular calibrated toothed surface 13 as shown in Fig. 2. The calibrations are provided in degrees in clockwise direction, for a total of 360 degrees, and to facilitate the reading and recording thereof I have placed numerals opposite the corresponding calibrations, as shown in Fig. 2. The frame 12 is vertically arranged within the frame 10 and detachably vertically adjustably secured thereto by the adjustable slide members 14, as shown in Fig. 3. The frame portions upon which the slides 14 move are calibrated the same as the supporting members 11 and this means of vertical adjustment is likewise old in the art and is not shown in detail.

In the frame 12 and below the annular surface 13 a circumscribing lip member 15 is formed. This lip member 15 extends closer to the center of the frame member 12 than the annular surface 13 and is designed as a supporting ledge to receive the chase which I will now describe.

The numeral 16 designates a circular chase having its center portion cut away to form the annular surface 17. The top portion of the periphery of the chase 16 extends outwardly to form the overhanging lip 18 and the chase 16 is rotatably arranged within the frame 12 so that the lip 18 rotatably slidably engages the lip 15. In this position the periphery of the chase 16 when rotated is closely adjacent the underside of the annular toothed surface 13.

The numeral 19 designates a spring catch means secured to the top surface of the chase 16 and designated to be yieldingly held in contact at any position desired on the toothed surface 13, as shown in Fig. 3. An eye 20 is provided on this catch means to facilitate the manual gripping thereof to release the catch when adjustment of the chase is desired.

On the back of the chase 16 a circumscribing groove 21 is formed in which I place the flat glass disc 22 that is secured therein by any suitable means such as glass cement, or the like. The numeral 23 designates two scored lines in the glass 22 each extending across the diameter thereof and at right angles to each other. The spring catch 19 is arranged on the chase in line with one of the lines 23, as shown in Fig. 3.

In using my invention the positive or negative 24 to be projected is detachably secured by the tape 25 or any other suitable means to the back side of the glass 22, as shown in Fig. 2 and Fig. 3. The scored lines 23 serve as guide lines in centering the negative 24, as illustrated in Fig. 3, and the dotted lines in Fig. 3 show the chase adjusted at a position other than horizontal.

When this device is constructed as described it is possible to project an image onto a surface at any position desired because of the horizontal, vertical and rotatable adjustments. Not only can all possible areas on the receiving surface be utilized but in color reproductions when more than one plate is used for the same reproduction, the projections onto different surfaces can be made to correspond in position thereon exactly to the same projection on other surfaces merely by duplicating the calibrated readings on the first. In this it is not necessary, of course, to remove and re-set the negative or positive as has heretofore been the practice.

Once the chase is set at a desired position, the spring catch will hold it in place until manually released. However, by noting the position of any setting, it can easily be duplicated should the adjustments on the frame portion or on the chase be accidentally moved.

Some changes may be made in the construction and arrangement of my means for projecting an image onto lithographing plates without departing from the real spirit and purpose of my invention, and it is my intention to cover by my claims, any modified forms of structure or use of mechanical equivalents which may be reasonably included within their scope.

I claim:

1. A rotating chase for projecting an image onto lithographing plates, comprising a support member, a frame member movably engaging said support member and capable of horizontal adjustment thereon, a frame member arranged within said first mentioned frame member and detachably vertically adjustably secured thereto; said second mentioned frame member having its center portion cut out to form an annular surface therein, a lip member circumscribing said annular surface, a circular chase having its center portion removed to form an annular surface; said chase designed to be capable of rotatably slidably engaging said lip member, a glass disc member secured to said chase, and a means for identifying any given position at which the rotation of said chase is stopped.

2. A rotating chase for projecting an image onto lithographing plates, comprising a support member, a frame member movably engaging said support member and capable of horizontal adjustment thereon, a frame member arranged within said first mentioned frame member and detachably vertically adjustably secured thereto; said second mentioned frame member having its center portion cut out to form an annular calibrated toothed surface therein, a lip member circumscribing said annular surface, a circular chase having its center portion removed to form an annular surface; said chase designed to be capable of rotatably slidably engaging said lip member below and closely adjacent said toothed surface, a glass disc member secured to said chase, and a means for detachably securing said chase to any given portion of said toothed surface at times.

3. In a device of the class described, two support members, a frame member having its top and bottom portions respectively movably engaging one of said support members and capable of horizontal adjustment thereon, a flat rectangular frame member arranged within said first mentioned frame member and detachably vertically adjustably secured to the side portions of said first mentioned frame member; said second mentioned frame member having its center portion removed to form an annular calibrated toothed surface, numerical identifying marks circumscribing said calibrated surface, a lip member circumscribing said annular surface, a circular chase having its center portion removed and rotatably slidably engaging said lip member, a glass member secured to said chase, scored guide lines provided in said glass member, and a spring catch secured to said chase and yieldingly engaging said toothed surface.

HAROLD W. ANDERSON.

REFERENCES CITED

The following references are of record in the file of this patent:

UNITED STATES PATENTS

| Number | Name | Date |
|---|---|---|
| 600,688 | Goodwin | Mar. 15, 1898 |
| 1,113,549 | Franke | Oct. 13, 1913 |
| 1,654,070 | Corlett et al. | Dec. 27, 1927 |
| 1,818,499 | Mueller | Aug. 11, 1931 |
| 1,911,142 | Cahill | May 23, 1933 |

FOREIGN PATENTS

| Number | Country | Date |
|---|---|---|
| 22,469 | Great Britain | of 1905 |